United States Patent
Pautis et al.

(10) Patent No.: US 10,144,500 B2
(45) Date of Patent: Dec. 4, 2018

(54) AIRCRAFT NACELLE COMPRISING AT LEAST ONE FAN COWL DOOR WHICH IS MOUNTED SO AS TO BE ABLE TO ROTATE ABOUT THE LONGITUDINAL AXIS OF THE NACELLE

(71) Applicant: Airbus Operations (SAS), Toulouse (FR)

(72) Inventors: Olivier Pautis, Merville (FR); Jerome Colmagro, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 204 days.

(21) Appl. No.: 15/160,579

(22) Filed: May 20, 2016

(65) Prior Publication Data

US 2016/0340024 A1 Nov. 24, 2016

(30) Foreign Application Priority Data

May 21, 2015 (FR) ..................................... 15 54557

(51) Int. Cl.
*B64C 7/02* (2006.01)
*B64D 29/08* (2006.01)
(Continued)

(52) U.S. Cl.
CPC ............... *B64C 7/02* (2013.01); *B64D 27/26* (2013.01); *B64D 29/06* (2013.01); *B64D 29/08* (2013.01); *F05D 2230/72* (2013.01)

(58) Field of Classification Search
CPC .......... B64C 7/02; B64D 29/06; B64D 29/08; F05D 2230/72
See application file for complete search history.

(56) References Cited

U.S. PATENT DOCUMENTS 5,350,136 A * 9/1994 Prosser .................. B64D 29/08
244/118.2
5,673,874 A * 10/1997 Howard ................ B64C 1/1438
244/129.4
(Continued)

FOREIGN PATENT DOCUMENTS

| FR | 2890378 | 3/2007 |
|----|---------|--------|
| FR | 2933071 | 1/2010 |
| FR | 3005453 | 11/2014 |

OTHER PUBLICATIONS

French Search Report, dated Jan. 29, 2016, priority document.

*Primary Examiner* — Brian M O'Hara
*Assistant Examiner* — Keith L Dixon
(74) *Attorney, Agent, or Firm* — Greer, Burns & Crain, Ltd.

(57) ABSTRACT

A nacelle having a longitudinal axis and comprising a chassis, two articulated fan cowl doors and a sliding fan cowl door. Each articulated fan cowl door is rotatably mounted in an upper portion of the chassis, each about their own opening axis. The opening axes are parallel to the longitudinal axis. The articulated doors pivot between a closed position and an open position. The sliding fan cowl door, in its closed position, is placed between free edges of the articulated fan cowl doors. A sliding arrangement for the sliding door is configured such that, in the open position of either articulated door, the sliding fan cowl door can rotate about the longitudinal axis. The nacelle has fan cowl doors which take up less space when in the open position and which are more compact, in comparison to articulated fan cowl doors without a sliding fan cowl door.

10 Claims, 3 Drawing Sheets

(51) Int. Cl.
*B64D 27/26* (2006.01)
*B64D 29/06* (2006.01)

(56) References Cited

U.S. PATENT DOCUMENTS

| | | | |
|---|---|---|---|
| 7,789,347 B2 * | 9/2010 | Oberle | B64D 29/06 |
| | | | 244/129.4 |
| 8,091,832 B2 * | 1/2012 | Marche | B64D 29/08 |
| | | | 244/129.5 |
| 9,783,314 B2 * | 10/2017 | Pautis | B64D 29/00 |
| 2008/0277529 A1 | 11/2008 | Marche | |
| 2009/0272842 A1 | 11/2009 | Bulin | |
| 2011/0091317 A1 | 4/2011 | Regard | |
| 2014/0334922 A1 | 11/2014 | Fabre et al. | |

* cited by examiner

AIRCRAFT NACELLE COMPRISING AT LEAST ONE FAN COWL DOOR WHICH IS MOUNTED SO AS TO BE ABLE TO ROTATE ABOUT THE LONGITUDINAL AXIS OF THE NACELLE

CROSS-REFERENCES TO RELATED APPLICATIONS

This application claims the benefit of the French patent application No. 1554557 filed on May 21, 2015, the entire disclosures of which are incorporated herein by way of reference.

BACKGROUND OF THE INVENTION

The present invention relates to an aircraft nacelle comprising two fan cowl doors which are mounted rotatably about an axis parallel to the longitudinal axis of the nacelle, and to an aircraft comprising at least one such nacelle.

An aircraft comprises at least one nacelle which houses an engine, for example of the jet engine type, and which is suspended from a pylon attached beneath a wing of the aircraft.

Conventionally, a nacelle for a jet engine is structured with three functional zones: the air intake zone at the front, in the upstream direction of the aerodynamic flow; the zone of the fan cowl doors in the central portion, which cover the casing of the fan of the engine; and the thrust-reversal system zone, which covers the turbine unit of the jet engine at the rear, in the downstream direction of the aerodynamic flow. The zone of the fan cowl doors of the nacelle comprises two fan cowl doors which are arranged on either side of the pylon and which may be opened in order to carry out maintenance on the engine.

Each fan cowl door is articulated on hinges about an opening axis parallel to the longitudinal axis of the nacelle and arranged in the upper portion of the fan cowl door.

Thus, each fan cowl door is able to move between a closed position in which the fan cowl door is arranged in line with the outer surface of the nacelle so as to cover the fan casing, and an open position in which an operative has access to the engine.

The lower edges of the fan cowl doors, which are located in the lower portion of the nacelle, are essentially touching in the closed position and are held in this closed position by a locking system which holds the two fan cowl doors together.

Currently, nacelles are increasing in size, which also implies an increase in the size of these fan cowl doors. However, when the fan cowl doors are in the open position, it is necessary to keep a safe distance between the fan cowl doors and the surface of the wing beneath which the nacelle is installed. Keeping this safe distance means that the opening of the fan cowl doors is limited, which reduces accessibility for the operative.

In addition, the increasing diameter of the nacelles tends to reduce the clearance between the bottom of the nacelles and the ground. This makes access to the fan cowl door locking system difficult for the operatives.

Furthermore, the increased size of the fan cowl doors has consequences for their manufacturing tolerances, deformation in flight, or the need to strengthen the hinges.

SUMMARY OF THE INVENTION

One object of the present invention is to provide an aircraft nacelle which does not have the drawbacks of the prior art and which, in particular, has a fan cowl door which is mounted so as to be able to rotate about the longitudinal axis of the nacelle, and fan cowl doors of reduced size.

To that end, what is disclosed is a nacelle having a longitudinal axis X and comprising:
- a chassis,
- two articulated fan cowl doors, each being mounted rotatably in the upper portion of the chassis about an opening axis parallel to the longitudinal axis X, between a closed position and an open position,
- a sliding fan cowl door which, in the closed position, is placed between the free edges of the articulated fan cowl doors, and
- a sliding arrangement configured such that, in the open position of either articulated fan cowl door, the sliding fan cowl door can rotate about the longitudinal axis X.

Such a nacelle thus has fan cowl doors which take up less space when in the open position and which are more compact in comparison to the fan cowl doors of the prior art.

Advantageously, the sliding arrangement comprises two circular rail systems which are secured to the chassis and of which one is arranged at the front portion of the sliding fan cowl door and of which the other is arranged at the rear portion of the sliding fan cowl door.

Advantageously, each circular rail system has a C-shaped groove secured to the chassis and one or more pegs which are secured to the sliding fan cowl door and are free to move in the groove.

Advantageously, the nacelle further comprises, for each articulated fan cowl door, a locking system provided between the sliding fan cowl door and the articulated fan cowl door at the free edges of the fan cowl doors in order to lock the sliding fan cowl door and the articulated fan cowl door to each other in the closed position.

Advantageously, the nacelle comprises:
- an air intake zone at the front, in the upstream direction of the aerodynamic flow,
- a thrust-reversal system zone at the rear, in the downstream direction of the aerodynamic flow,
- a central zone of fan cowl doors, located between the air intake zone and the thrust-reversal system zone,
- the two articulated fan cowl doors and the sliding fan cowl door being located in the central zone of fan cowl doors.

The invention also proposes an aircraft comprising a pylon below which is attached a nacelle according to one of the preceding variants.

BRIEF DESCRIPTION OF THE DRAWINGS

The above-mentioned features of the invention, as well as others, will emerge more clearly upon reading the following description of an exemplary embodiment, the description being given with reference to the appended drawings, in which.

DETAILED DESCRIPTION OF THE PREFERRED EMBODIMENTS

Figure 1:
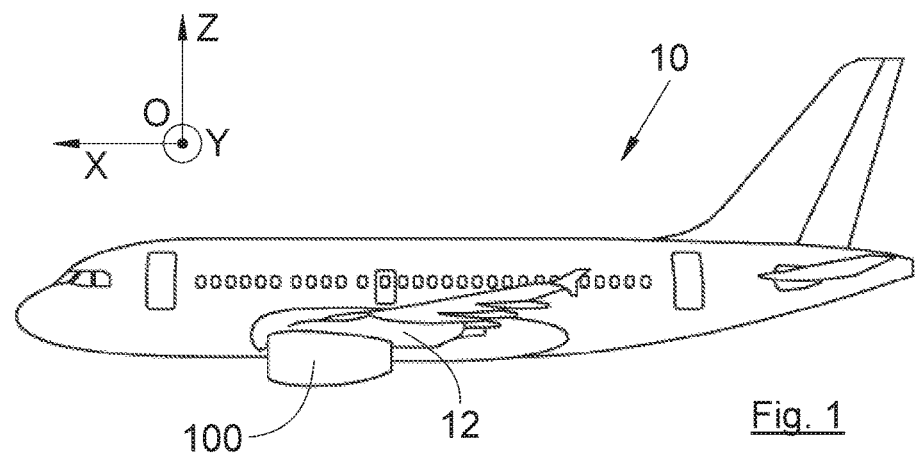
FIG. 1 shows a side view of an aircraft having a nacelle according to the invention.

FIG. 1 shows an aircraft 10 which comprises, as is conventional, at least two nacelles 100, of which only one is visible in FIG. 1 and is essentially cylindrical in shape. Each nacelle 100 is attached below a pylon 12 of the aircraft 10.

In the description that follows, and as is conventional, the X axis is the longitudinal axis of the aircraft 10, with positive orientation in the direction of advance of the aircraft 10, this being also the longitudinal axis of the nacelle 100; the Y axis is the transverse axis of the aircraft and is horizontal when the aircraft is on the ground; the Z axis is the vertical axis or vertical height when the aircraft is on the ground; these three directions X, Y and Z are mutually orthogonal and form an orthogonal reference system with origin O. The terms relating to a position in this document are considered with reference to an aircraft 10 in a normal advancing position of use, as shown in FIG. 1.

Figure 2:
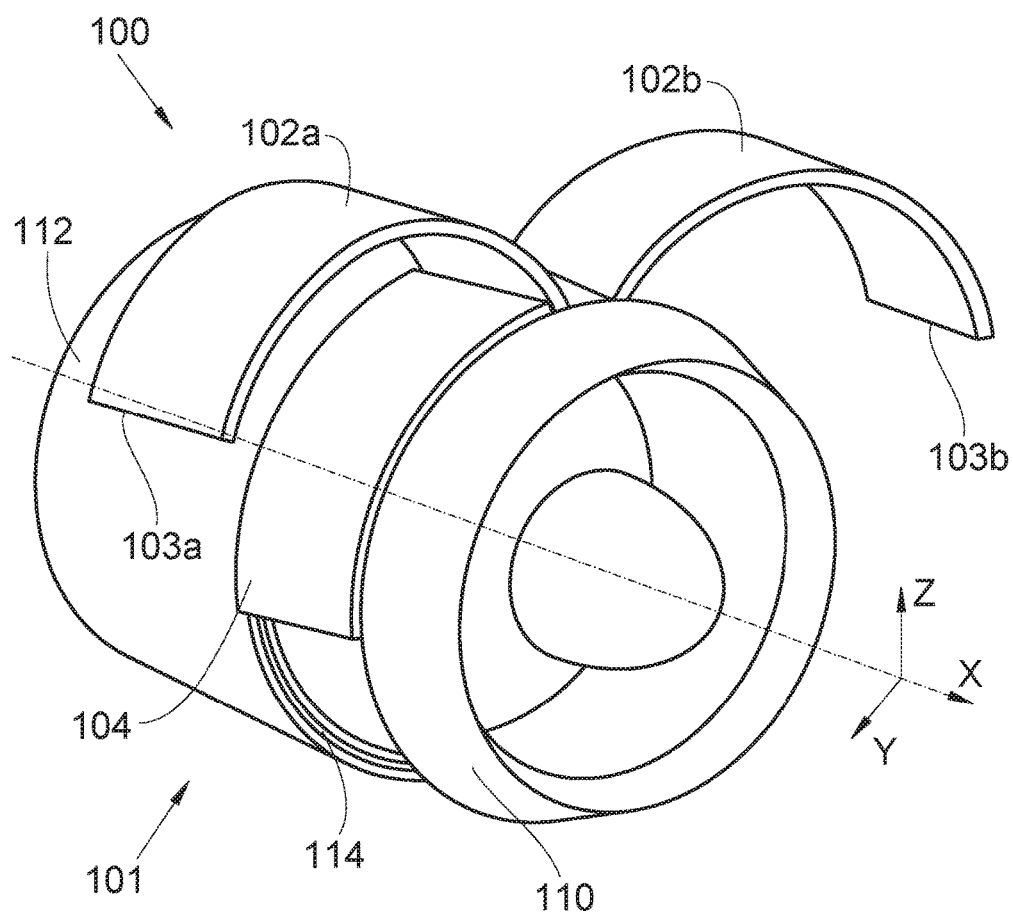
FIG. 2 shows a perspective view of the nacelle according to the invention in the open position.

FIG. 2 shows the nacelle 100 that comprises a chassis 101 which is attached to the pylon 12 and which supports the engine. The nacelle 100 has three functional zones: an air intake zone 110 at the front, in the upstream direction of the aerodynamic flow passing through the engine; a zone of the fan cowl doors in the central portion; and a thrust-reversal system zone 112, which covers the turbine unit of the jet engine at the rear, in the downstream direction of the aerodynamic flow.

In the central zone of the fan cowl doors, the nacelle 100 comprises fan cowl doors which cover the casing of the fan of the engine. More precisely, it comprises two articulated fan cowl doors 102a and 102b, each being mounted rotatably on the chassis 101 by means of hinges (302a-b, FIG. 3), each about an opening axis parallel to the longitudinal axis X of the nacelle 100 and arranged in the upper portion of the chassis 101. The two articulated fan cowl doors 102a-b, and the two opening axes, are arranged on either lateral side of the pylon 12. The two articulated fan cowl doors 102a-b are arranged longitudinally between the air intake zone 110 and the thrust-reversal system zone 112.

Thus, each articulated fan cowl door 102a-b is able to separately move between a closed position (FIG. 3) in which the articulated fan cowl door 102a-b is arranged in line with an outer surface of the nacelle 100, in this case the envelope of the air intake zone 110 and of the thrust-reversal system zone 112, so as to cover the casing of the fan and an open position (FIG. 2) in which the articulated fan cowl door 102a-b is pivotally moved away from the chassis 101 and in which an operative has access to the interior of the nacelle 100.

The nacelle 100 also has a sliding fan cowl door 104 which is also arranged longitudinally between the air intake zone 110 and the thrust-reversal system zone 112, in line with the outer surface of the nacelle 100. The sliding fan cowl door 104 is able to move angularly in rotation on the chassis 101 about the longitudinal axis X. To that end, the nacelle 100 has a sliding arrangement which is configured so as to allow the sliding fan cowl door 104 to rotate about the longitudinal axis X, on the periphery of the nacelle 100 between the rear end of the air intake zone 110 and the front end of the thrust-reversal system zone 112 when the articulated fan cowl doors 102a-b are in the open position. The angular extent of the sliding arrangement determines the amplitude of the movement of the sliding fan cowl door 104.

Figure 3:
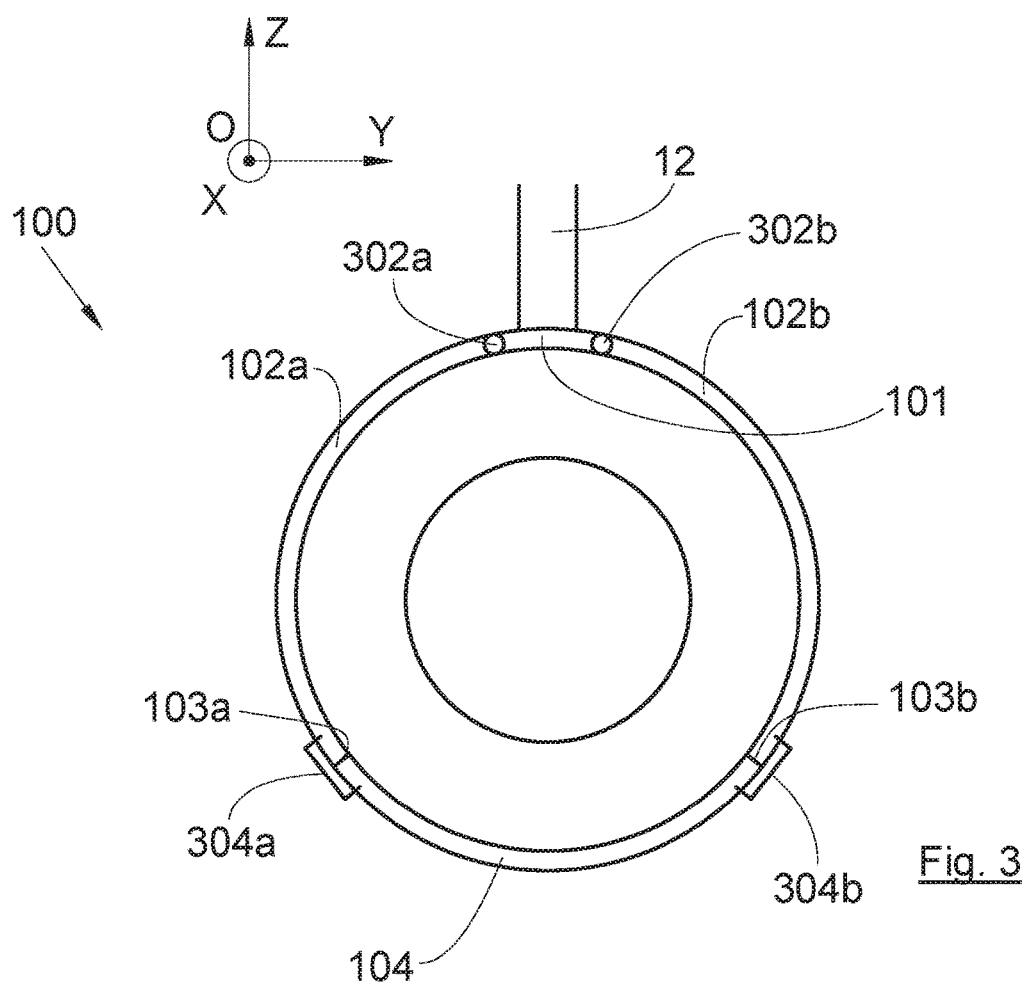
FIG. 3 shows a cross-sectional view of the nacelle of FIG. 2 in a plane perpendicular to the longitudinal axis of the nacelle, and, FIG. 4 shows another cross-sectional view of a portion of the nacelle of FIG. 2.

FIG. 3 shows the nacelle 100 when the fan cowl doors 102a-b and 104 are in the closed position. In that case, the two articulated fan cowl doors 102a-b close on the chassis 101 and the sliding fan cowl door 104 is positioned between the free edges 103a-b of the articulated fan cowl doors 102a-b, that is to say, in this case, in the lower portion of the nacelle 100. The angular extent of each fan cowl door 102a-b, 104 is such that, in the closed position, the fan cowl doors 102a-b and 104 are touching and entirely cover the chassis 101. The free edge 103a-b is that edge which moves outward in the open position and is opposite the edge bearing the hinge 302a-b.

In order to transition into the open position, the two articulated fan cowl doors 102a-b are lifted up and moved away from the chassis 101 by rotation about the hinges 302a-b, and the sliding fan cowl door 104 is then free to move about the chassis 101 to one side or the other of the nacelle 100. In the depiction of the invention shown in FIG. 2, the sliding fan cowl door 104 has been moved to the starboard side of the nacelle 100, but it may equally move to the port side.

Thus, the nacelle 100 has three movable fan cowl doors 102a-b and 104 which are smaller than those of the prior art, making it possible to compensate for the effects of the increased size of the nacelle 100. These fan cowl doors permit better accessibility to the interior of the nacelle 100, and simpler production. In addition, these smaller panels make it possible to limit in-flight deformations, which give rise to scooping phenomena. They thus make it possible to reduce drag and therefore the overall fuel consumption of the airplane.

Figure 4:
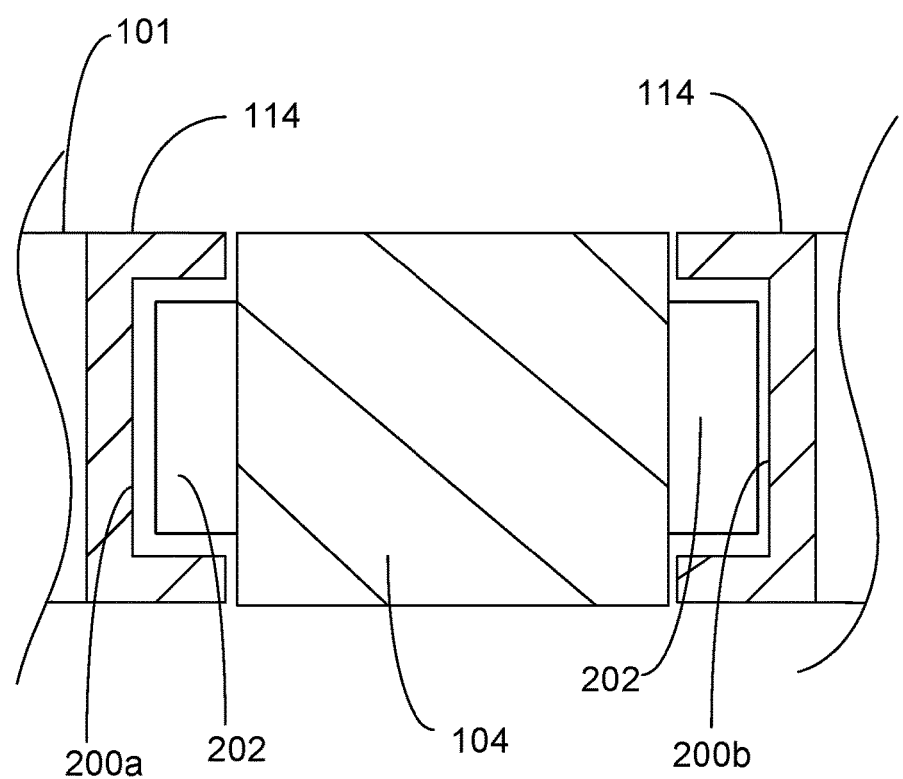

The sliding arrangement is in the form of two circular rail systems 114 which are secured to the chassis 101 and of which one is arranged at the front portion of the sliding fan cowl door 104 and of which the other is arranged at the rear portion of the sliding fan cowl door 104. According to one particular embodiment as shown in more detail in FIG. 4, each circular rail system 114 has for example a C-shaped or dovetail-shaped groove 200a, 200b secured to the chassis 101 and one or more pegs 202 which are secured to the sliding fan cowl door 104 and are free to move in the grooves 200a, 200b. However, a person skilled in the art will have no difficulty in imagining other sliding arrangements.

In order to hold the fan cowl doors 102a-b and 104 in the closed position, and thus lock the sliding fan cowl door 104 in the closed position and each of the articulated fan cowl doors 102a-b to the other, the nacelle 100 comprises, for each articulated fan cowl door 102a-b, a locking system 304a-b provided between the sliding fan cowl door 104 and the articulated fan cowl door 102a-b at the free edges 103a-b of the articulated fan cowl doors 102a-b and at free edges of the sliding fan cowl door 104. Each locking system 304a-b is shown symbolically in FIG. 3 and it may take the form of any known locking system.

Due to the angular extent of the sliding fan cowl door 104, each locking system 304a-b is more easily accessible than in the case of the prior art. Indeed, each locking system 304a-b is located on the lateral side of the nacelle 100 and not underneath the nacelle.

As shown in FIG. 2, the sliding fan cowl door 104 may move until it is adjacent to either of the hinges 302a-b of the articulated fan cowl doors 102a-b.

The particular arrangement described above also makes it possible to open one articulated fan cowl door 102a-b irrespective of whether or not the other articulated fan cowl door 102b-a is open.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle having a longitudinal axis and comprising:
   a chassis,
   two articulated fan cowl doors, each being rotatably mounted in a portion of the chassis about their own opening axis, and each having a free edge opposite the opening axis, the opening axes being parallel to the longitudinal axis, and each of the articulated fan cowl doors being rotatable between a closed position and an open position about their own opening axis,
   a sliding fan cowl door which, in the closed position of both articulated fan cowl doors, is placed between the free edges of the articulated fan cowl doors, and
   a sliding arrangement configured such that the sliding fan cowl door is configured to rotate about the longitudinal axis only when one or both of the articulated fan cowl doors are in the open position.

2. The nacelle according to claim 1, wherein the sliding arrangement comprises two circular rail systems which are secured to the chassis and of which one is arranged at a front portion of the sliding fan cowl door and of which the other is arranged at a rear portion of the sliding fan cowl door.

3. The nacelle according to claim 2, wherein each circular rail system has a C-shaped groove secured to the chassis and one or more pegs which are secured to the sliding fan cowl door and are free to move in the groove.

4. The nacelle according to claim 1, further comprising, for each articulated fan cowl door, a locking system provided between the sliding fan cowl door and said articulated fan cowl door to lock the sliding fan cowl door and the articulated fan cowl door to each other in the closed position.

5. The nacelle according to claim 1, further comprising:
   an air intake zone at a front, in an upstream direction of an aerodynamic flow,
   a thrust-reversal system zone at a rear, in a downstream direction of the aerodynamic flow,
   a central zone of fan cowl doors, located between said air intake zone and said thrust-reversal system zone,
   said two articulated fan cowl doors and said sliding fan cowl door being located in said central zone of fan cowl doors.

6. An aircraft comprising:
   a pylon,
   a nacelle having a longitudinal axis and being attached below the pylon, the nacelle comprising:
   a chassis,
   two articulated fan cowl doors, each being rotatably mounted in a portion of the chassis about their own opening axis, and each having a free edge opposite the opening axis, the opening axes being parallel to the longitudinal axis, and each of the articulated fan cowl doors being rotatable between a closed position and an open position,
   a sliding fan cowl door which, in the closed position of both articulated fan cowl doors, is placed between the free edges of the articulated fan cowl doors, and
   a sliding arrangement configured such that the sliding fan cowl door is configured to rotate about the longitudinal axis only when one or both of the articulated fan cowl doors are in the open position.

7. The aircraft according to claim 6, wherein the sliding arrangement comprises two circular rail systems which are secured to the chassis and of which one is arranged at a front portion of the sliding fan cowl door and of which the other is arranged at a rear portion of the sliding fan cowl door.

8. The aircraft according to claim 7, wherein each circular rail system has a C-shaped groove secured to the chassis and one or more pegs which are secured to the sliding fan cowl door and are free to move in the groove.

9. The aircraft according to claim 6, further comprising, for each articulated fan cowl door, a locking system provided between the sliding fan cowl door and said articulated fan cowl door to lock the sliding fan cowl door and the articulated fan cowl door to each other in the closed position.

10. The aircraft according to claim 6, further comprising:
    an air intake zone at a front, in an upstream direction of an aerodynamic flow,
    a thrust-reversal system zone at a rear, in a downstream direction of the aerodynamic flow,
    a central zone of fan cowl doors, located between said air intake zone and said thrust-reversal system zone,
    said two articulated fan cowl doors and said sliding fan cowl door being located in said central zone of fan cowl doors.

* * * * *